Jan. 30, 1923.

H. D. REY.
VEHICLE WHEEL.
ORIGINAL FILED MAY 9, 1921.

WITNESSES
R. E. Rousseau
L. G. Quesada

INVENTOR
Henri D. Rey,
BY
ATTORNEYS

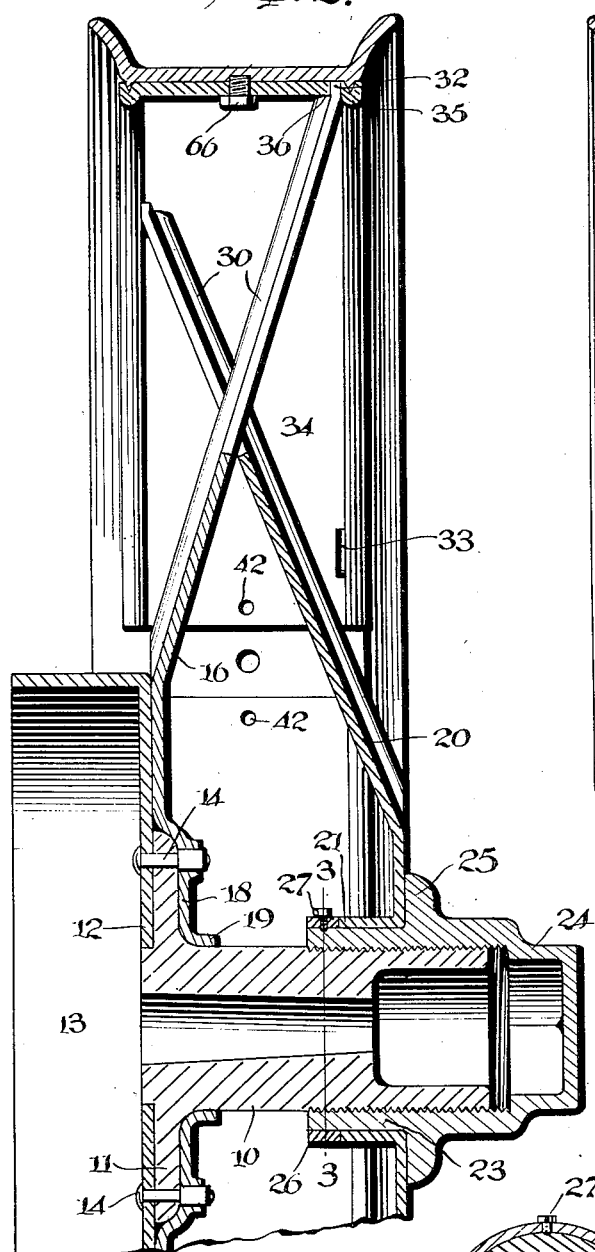

Patented Jan. 30, 1923.

1,443,717

UNITED STATES PATENT OFFICE.

HENRI DANIEL REY, OF AVARUA, RAROTONGA, COOK ISLANDS.

VEHICLE WHEEL.

Application filed May 9, 1921, Serial No. 468,114. Renewed September 22, 1922. Serial No. 589,918.

*To all whom it may concern:*

Be it known that I, HENRI D. REY, a citizen of the French Republic, and a resident of Avarua, Rarotonga, Cook Islands, have invented certain new and useful Improvements in Vehicle Wheels, of which the following is a specification.

This invention is an improvement in vehicle wheels and is an improvement on the construction disclosed in my application for patent S. N. 356,856.

An important object of this invention is to provide a vehicle wheel having novel means whereby the felly of the same may be extended after a tire rim has been applied thereto so as to securely grip the tire rim and hold the same in position.

The invention forming the subject matter of this application aims also to provide a vehicle wheel having a split felly and novel means whereby the ends of the felly may be arranged in spaced relation to receive the stem or nipple of the tire valve in such a manner that the tire valve will not be sheared off as a result of movement of the tire with relation to the wheel.

A further object of the invention is to provide a vehicle wheel which is of highly simplified construction, efficient in use and cheap to manufacture.

Other objects and advantages of the invention will be apparent during the course of the following description.

In the accompanying drawings, forming a part of this application, and in which like numerals are employed to designate like parts throughout the same.

Figure 2 is a detail vertical transverse sectional view through the same.

Figure 3 is a vertical transverse sectional view taken on line 3—3 of Figure 2.

Figure 4 is a detail elevation of a spacing element embodied in the invention and which is adapted to be arranged between the split ends of the wheel felly.

Figure 5 is a detail sectional view through a slightly modified form of wheel.

Figure 1:
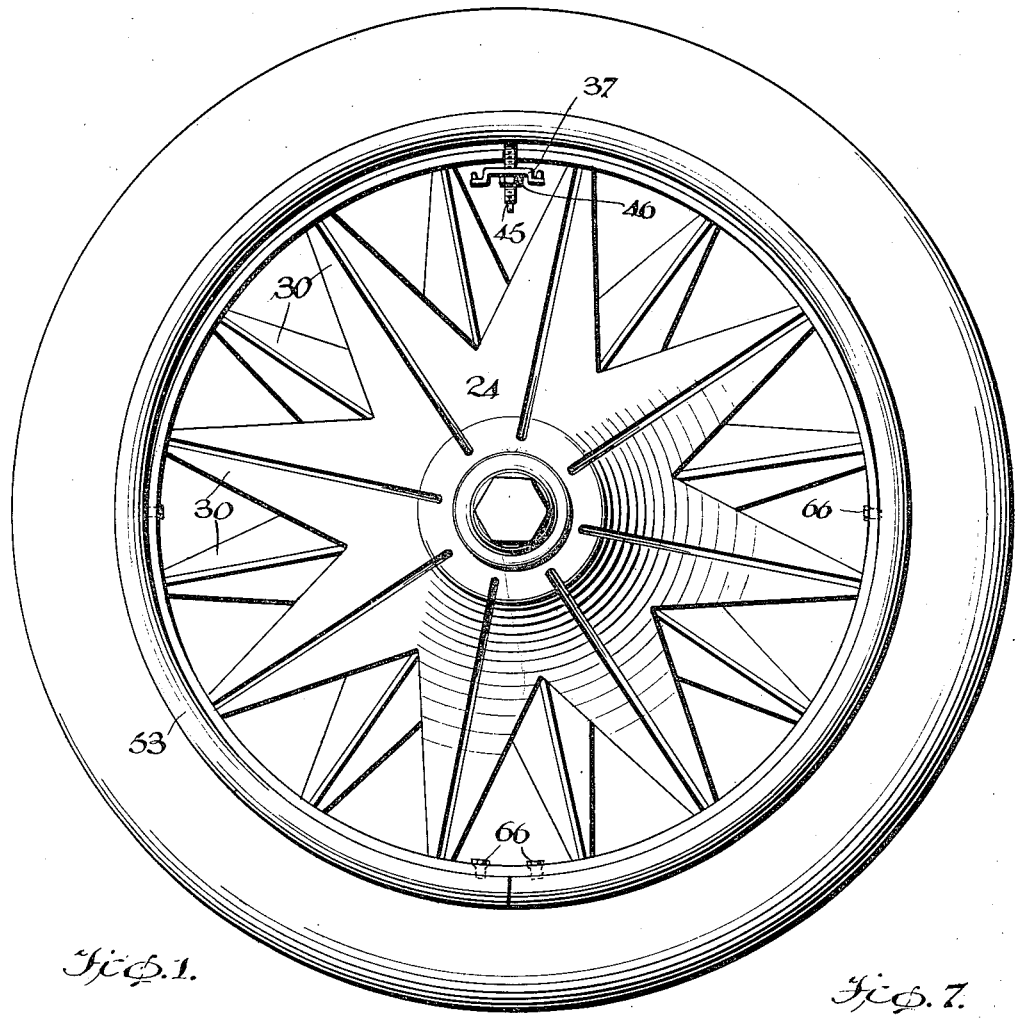
Figure 1 is a side elevation of the improved vehicle wheel equipped with a rim and a tire.
Figures 6, 7:
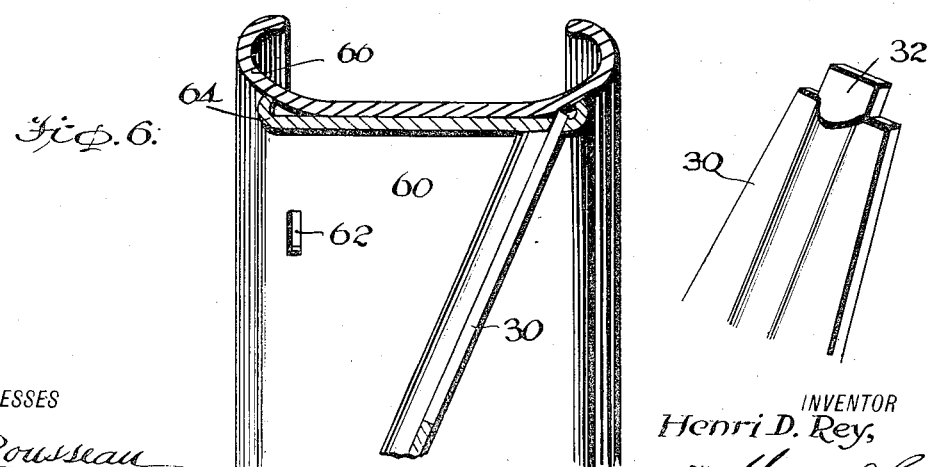

Figure 6 is a detail sectional view through a modified form of wheel.

Figure 7 is a fragmentary perspective of a spoke embodied in the invention.

In the drawings, wherein for the purpose of illustration as shown a preferred embodiment of the invention, the numeral 10 designates a hub having one end portion provided with a radial flange 11 to which a web 12 of a brake drum 13 is secured by means of fastening devices 14. As illustrated in Figure 2 the annular flange 11 is also connected to a spoke section 16 by means of a fastening device 14 which extends through the central offset portion 18 of the spoke section 16. The central offset portion 18 of the spoke section is provided with an inwardly extending annular flange 19 which receives the hub 10.

A second spoke section 20 is arranged about the hub and has a central portion provided with an inwardly extending annulus or flange 21 which is arranged about the hub 10 in spaced relation to the same.

The annulus 21 which is arranged about the hub 10 in spaced relation to the same receives the attaching portion 23 of an adjusting and fastening nut 24 and it will be observed that the attaching portion 23 is interiorly screw threaded and has engagement with the threaded end portion of the hub 10. The intermediate portion of the nut 24 is provided with an additional flange 25 which engages the adjacent side of the spoke section 20 and adjusts the same with relation to the other spoke section 16 and the hub shaft. The inner end of the annulus 21 contacts with the stop element or ring 26 which is mounted upon the attaching portion 23 of the nut and is provided with one or more set screws 27 which engage the adjacent portion of the nut for holding the ring in position.

The outer end of the spokes 30 which are extensions of the spoke section 20 are formed with reduced attaching portion 32 which are adapted to be received within spaced openings 33 in a felly 34. The edge portion of the felly 34 are formed with inwardly extending annular retaining elements 35 which engage the end portion of the spokes 30 and thereby relieve the strain on the reduced attaching portion 32. In other words, the end portion of the spokes 30 contact with inwardly extending retaining member 35 and are braced by the same. When the nut 24 is tightened the spoke section 20 is, of course, moved inwardly in the direction of the spoke section so that the spokes are moved outwardly for expanding the felly 34 which is split. The reduced end portions 32 of the spokes 30 define shoulders 36 which contact with the inner side of the felly.

Upon being expanded, the felly 34 is of course, held in this position by the nut 24 and also by a spacing element in the form of an elongated plate 37. As illustrated in Figure 4, the end portions of the plate 37 are offset so as to define shoulders 38 which engage the ends of the felly 34 so as to hold the ends in spaced relation. The offset portions 40 of the elongated plate 37 are provided with lugs 41 which are adapted to be received within openings 42 in the end portions of the felly 34. When the lugs 41 are received within the openings 42, the retaining member 37 is securely held in position and is prevented from turning and permitting the ends of the rim from coming together. The plate 37 is formed with a centrally arranged opening 44 to receive the stem or nipple of a tire valve indicated by the numeral 45. The nut 46 is threaded on the stem 45 and firmly holds the spacing plate 37 in position. As the ends of the felly 34 are spaced a distance from the valve stem or nipple, the nipple will not be permitted to wear off as a result of continued use of the tire.

In the form of the invention illustrated in Figure 5, the edge portions of the rim designated by the numeral 50 are extended outwardly to form retaining flanges 52 which engage the sides of the rim 53 so as to hold the rim securely on the felly. Also, in this form of the invention, the felly is formed with a plurality of spaced openings 54 which receive the end portions of the spokes 30. The openings 54 are formed by striking out portions of the felly which in addition to forming the openings form inwardly extending retaining elements 55. The retaining lugs or elements 55 function similarly to the inwardly extending annular flange 35 as illustrated in Figure 2.

In the form of the invention illustrated in Figure 6, the rim designated by the numeral 60 is formed with a plurality of openings 62 which receive the end portions of the spokes 30. The edge portions of the rim are extended inwardly as indicated at 64 so as to securely hold a clincher rim 66 in position.

With reference to the foregoing description taken in connection with accompanying drawings, it will be observed that the wheel constructed in accordance with this invention may be readily and conveniently adjusted so as to tightly engage the rim whereby the rim will be securely held in position. In order that the rim might be more securely held upon the felly, I have provided a plurality of catch screws 66 which are extended through the felly and engage the central portion of the rim so as to hold the same against lateral movement with relation to the wheel.

Having thus fully described my invention what I claim as new is:—

1. A wheel comprising a felly having its edge portions formed with inwardly extending annular flanges constituting stop elements, spokes having their end portions reduced and extended through the felly, said spokes being engaged with the inwardly extended edge portions of said felly, and a hub connected to said spokes.

2. A wheel comprising a felly having its edge portions formed with inwardly extending annular flanges constituting stop elements, spokes having their end portions reduced and extended through the felly, said spokes being engaged with the inwardly extended edge portions of said felly, a hub connected to said spoke, and an adjusting nut threaded on said hub and adapted for expanding said felly.

3. A wheel comprising a felloe provided with spaced openings and having one edge portion provided with an inwardly directed annular flange constituting a stop element, spokes extended through said openings and engaged with said stop element, said inwardly extending annular flange also forming a means to strengthen the felloe, and a hub connected to said spokes.

4. A wheel comprising a felloe having an inwardly directed annular reinforcing flange constituting a stop element, a spoke section having spokes connected to said felloe and engaged with said stop element, and means carried by said felloe to secure a rim thereon.

HENRI DANIEL REY.